United States Patent
Liu et al.

(10) Patent No.: US 9,197,097 B2
(45) Date of Patent: Nov. 24, 2015

(54) TEMPERATURE-CONTROLLED POWER SUPPLY SYSTEM AND METHOD

(71) Applicant: Energy Pass Incorporation, Hsinchu (TW)

(72) Inventors: Chao-Hsuan Liu, New Taipei City (TW); Hsueh-Wen Tseng, Hsinchu County (TW); Chia-Hsieh Wu, Changhua County (TW); Ying-Che Lo, Tainan City (TW)

(73) Assignee: Energy Pass Incorporation, Hsinchu Science Park, Hsinchu (TW)

( * ) Notice: Subject to any disclaimer, the term of this patent is extended or adjusted under 35 U.S.C. 154(b) by 421 days.

(21) Appl. No.: 13/628,030

(22) Filed: Sep. 26, 2012

(65) Prior Publication Data

US 2014/0084848 A1    Mar. 27, 2014

(51) Int. Cl.
*H02J 7/00* (2006.01)
*H02J 7/04* (2006.01)

(52) U.S. Cl.
CPC *H02J 7/047* (2013.01); *H02J 7/007* (2013.01)

(58) Field of Classification Search
CPC .......................................................... H02J 7/00
USPC .......................................... 320/107, 134, 150
See application file for complete search history.

(56) References Cited

U.S. PATENT DOCUMENTS

| | | | |
|---|---|---|---|
| 5,504,416 A | 4/1996 | Holloway | |
| 5,773,956 A | 6/1998 | Wieczorek | |
| 2005/0088144 A1* | 4/2005 | Pacholok et al. | 320/131 |
| 2008/0024089 A1* | 1/2008 | Meng et al. | 320/128 |
| 2011/0148342 A1* | 6/2011 | Wahlqvist et al. | 320/101 |

FOREIGN PATENT DOCUMENTS

TW    201101645    1/2011

* cited by examiner

*Primary Examiner* — Mohammed Alam
(74) *Attorney, Agent, or Firm* — Winston Hsu; Scott Margo

(57) ABSTRACT

A temperature-controlled power supply system is disclosed. The temperature-controlled power supply system comprises a power source, for supplying input power; a rechargeable battery module, for receiving the input power for power storage; a charging unit, coupled between the power source and the rechargeable battery module, for charging the rechargeable battery module with the input power; a temperature sensing unit, coupled to the rechargeable battery module, for sensing a temperature of the rechargeable battery module; and a current control unit, coupled to the temperature sensing unit and the charging unit, for controlling a current for charging the rechargeable battery module according to the temperature of the rechargeable battery module.

16 Claims, 5 Drawing Sheets

TEMPERATURE-CONTROLLED POWER SUPPLY SYSTEM AND METHOD

BACKGROUND OF THE INVENTION

1. Field of the Invention

The present invention relates to a temperature-controlled power supply system and method, and more particularly, to a temperature-controlled power supply system and method capable of maintaining a temperature of a rechargeable battery at a predefined value when the rechargeable battery is under charging.

2. Description of the Prior Art

With the popularization of portable devices, power supply systems with high sustainability and high efficiency are always required. Therefore, high-efficiency rechargeable battery systems are widely utilized in power supply systems. In general, a rechargeable battery is first charged by a power source to store electricity. When a portable device is equipped with the rechargeable battery and turned on, the rechargeable battery starts to supply power to the portable device.

Please refer to FIG. 1, which is a waveform diagram of charging voltage and current of a conventional charging process of a rechargeable battery. In general, the charging process can be classified into three modes: a pre-charge mode M1, a constant current mode M2, and a constant voltage mode M3. As shown in FIG. 1, if the initial voltage of the rechargeable battery is smaller than a pre-charge threshold voltage $V_{LOWV}$, the charging process falls in the pre-charge mode M1. In the pre-charge mode M1, the rechargeable battery is charged with a lower current. Since the voltage of the rechargeable battery is smaller than the pre-charge threshold voltage $V_{LOWV}$, the stored electricity of the rechargeable battery is near empty. At this moment, an inrush current or even a larger charging current will reduce the life of the rechargeable battery. After the voltage of the rechargeable battery is greater than the pre-charge threshold voltage $V_{LOWV}$, the charging process enters the constant current mode M2, i.e. the fast charge mode, and the power source starts to charge the rechargeable battery with a normal current, which is much greater than the current in the pre-charge mode M1. In the constant current mode M2, the charging current remains at a regulation current $I_{REG}$ and the voltage of the rechargeable battery keeps increasing. The regulation current $I_{REG}$ is a current regulated for charging the rechargeable battery according to power efficiency or life sustainability of the rechargeable battery.

After the voltage of the rechargeable battery increases to a regulation voltage $V_{REG}$, the charging process enters the constant voltage mode M3, and the voltage remains at the regulation voltage $V_{REG}$ and the charging current starts to decrease. After the charging current falls to a termination current $I_{TERM}$, the electricity stored in the rechargeable battery is near full and the charging process terminates.

As can be seen, in the constant current mode M2, the regulation current $I_{REG}$ is regulated for charging the rechargeable battery according to power efficiency or life sustainability of the rechargeable battery. However, a rechargeable battery may be unavoidably getting old. If the regulation current $I_{REG}$ is most adaptive for a newer rechargeable battery, it may not be still adaptive for an older rechargeable battery. One of the main reasons comes from temperature. For example, temperature may rise when a rechargeable battery is under charging due to the imperfection of power conversion. When the rechargeable battery becomes aging, the charging efficiency may be reduced, which may cause a higher temperature. If the temperature is too high and touches an over-temperature protection level, charging may be stopped, and restarted until the temperature falls to another level. As a result, life of the rechargeable battery may be reduced due to high temperature, and frequent stop and restart of charging may reduce the charging efficiency much more. Thus, there is a need for improvement of the prior art.

SUMMARY OF THE INVENTION

It is therefore an objective of the present invention to provide a temperature-controlled power supply system and method capable of maintaining a temperature of a rechargeable battery at a predefined value when the rechargeable battery is under charging.

The present invention discloses a temperature-controlled power supply system, which comprises a power source for supplying input power, a rechargeable battery module for receiving the input power for power storage, a charging unit, coupled between the power source and the rechargeable battery module, for charging the rechargeable battery module with the input power, a temperature sensing unit, coupled to the rechargeable battery module, for sensing a temperature of the rechargeable battery module, and a current control unit, coupled to the temperature sensing unit and the charging unit, for controlling a current for charging the rechargeable battery module according to the temperature of the rechargeable battery module.

The present invention further discloses a temperature-controlled power supply method, which comprises supplying input power, charging a rechargeable battery module with the input power, sensing a temperature of the rechargeable battery module, and controlling a current for charging the rechargeable battery module according to the temperature of the rechargeable battery module.

The present invention further discloses a temperature-controlled power supply system, which comprises a power source for supplying input power, a load unit for receiving the input power, a temperature sensing unit, coupled to the load unit, for sensing a temperature of the load unit, and a current control unit, coupled to the temperature sensing unit and the power source, for controlling a current for providing the load unit according to the temperature of the load unit.

The present invention further discloses a temperature-controlled power supply method, which comprises supplying input power to a load unit, sensing a temperature of the load unit, and controlling a current for providing the load unit according to the temperature of the load unit.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
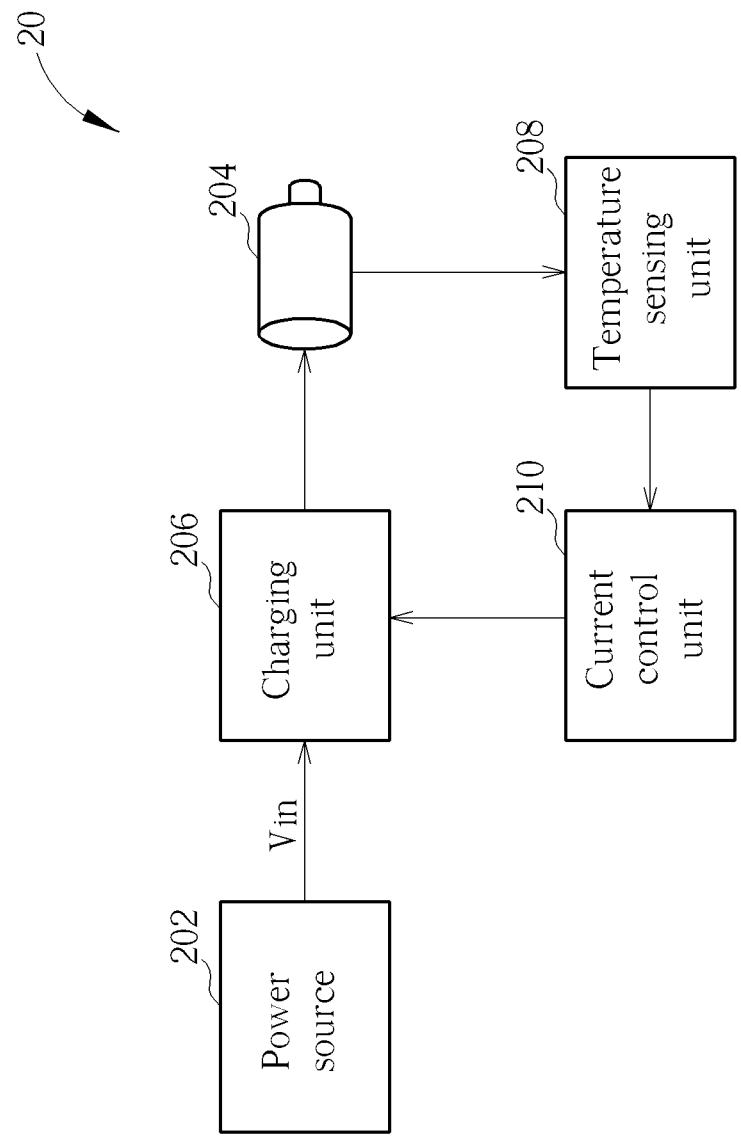
FIG. 2 is a schematic diagram of a temperature-controlled power supply system according to an embodiment of the present invention.

Please refer to FIG. 2, which is a schematic diagram of a temperature-controlled power supply system 20 according to an embodiment of the present invention. As shown in FIG. 2, the temperature-controlled power supply system 20 includes a power source 202, a rechargeable battery module 204, a charging unit 206, a temperature sensing unit 208, and a current control unit 210. The power source 202 supplies input power Vin to the charging unit 206, and may also supply power to the whole temperature-controlled power supply system 20. The rechargeable battery module 204 is utilized for storing the input power Vin. The charging unit 206, coupled between the power source 202 and the rechargeable battery module 204, is utilized for charging the rechargeable battery module with the input power Vin. The charging unit 204 may also be implemented in the power source 202, and is not limited herein. The temperature sensing unit 208, coupled to the rechargeable battery module 204, is utilized for sensing a temperature of the rechargeable battery module 204. The temperature sensing unit 208 may sense the ambient temperature of the rechargeable battery module 204 or sense the temperature inside the rechargeable battery module 204. In general, the temperature sensing unit 208 may be implemented with a resistor of which a resistance value varies with a variation of ambient temperature, and is not limited herein. The current control unit 210, coupled to the temperature sensing unit 208 and the charging unit 206, is utilized for controlling a current for charging the rechargeable battery module 204 according to the temperature of the rechargeable battery module 204.

Figure 1:
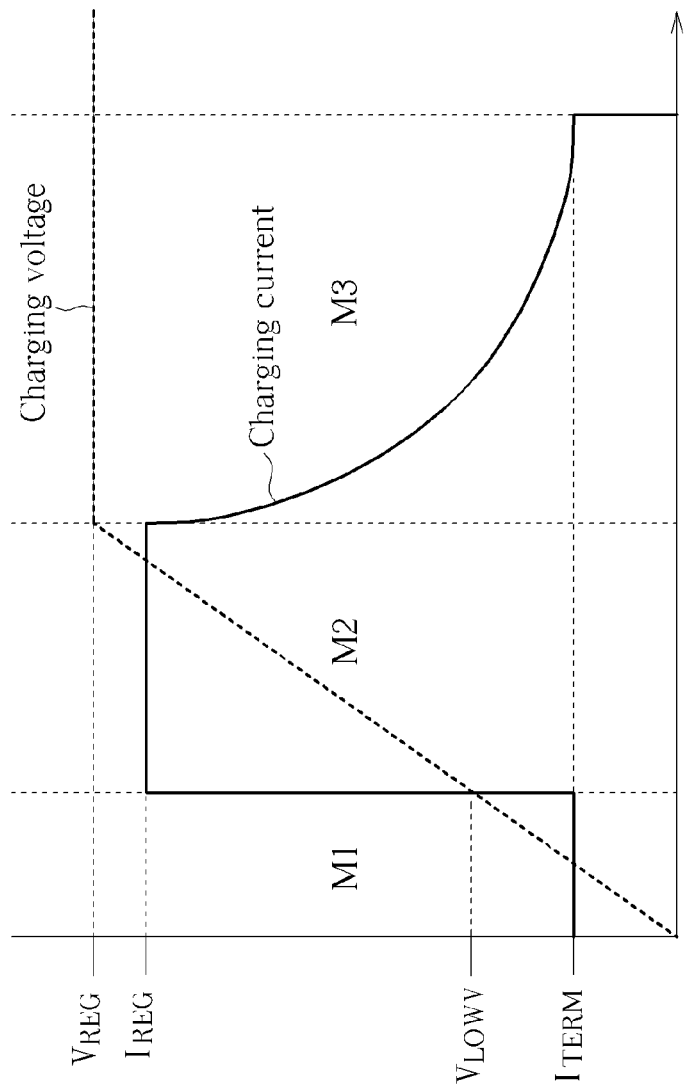
FIG. 1 is a waveform diagram of the charging voltage and current of a conventional charging process.

Please note that, the temperature-controlled power supply system 20 may charge the rechargeable battery module 204 in a constant temperature manner different from the conventional constant current manner. As shown in FIG. 1, in the constant current mode M2, the charging current remains at a regulation current $I_{REG}$, which is a current regulated for charging the rechargeable battery according to power efficiency or life sustainability of the rechargeable battery. In other words, if a rechargeable battery is charged with the regulation current $I_{REG}$, power efficiency or life sustainability of the rechargeable battery may be optimized when the rechargeable battery is charged with the regulation current $I_{REG}$.

As mentioned above, the regulation current $I_{REG}$ most adaptive for a newer rechargeable battery may not be still adaptive for an older rechargeable battery. One of the main reasons comes from temperature. Therefore, to deal with the temperature, the embodiment of the present invention senses the temperature of the rechargeable battery module 204 with the temperature sensing unit 208, and then controls the charging current to charge the rechargeable battery module 204 according to the sensed temperature, so as to keep the temperature of the temperature sensing unit 208 at or near a predefined value. Therefore, a constant temperature charging system is built up, and this constant temperature charging system is adaptive for all rechargeable batteries.

Figure 3:
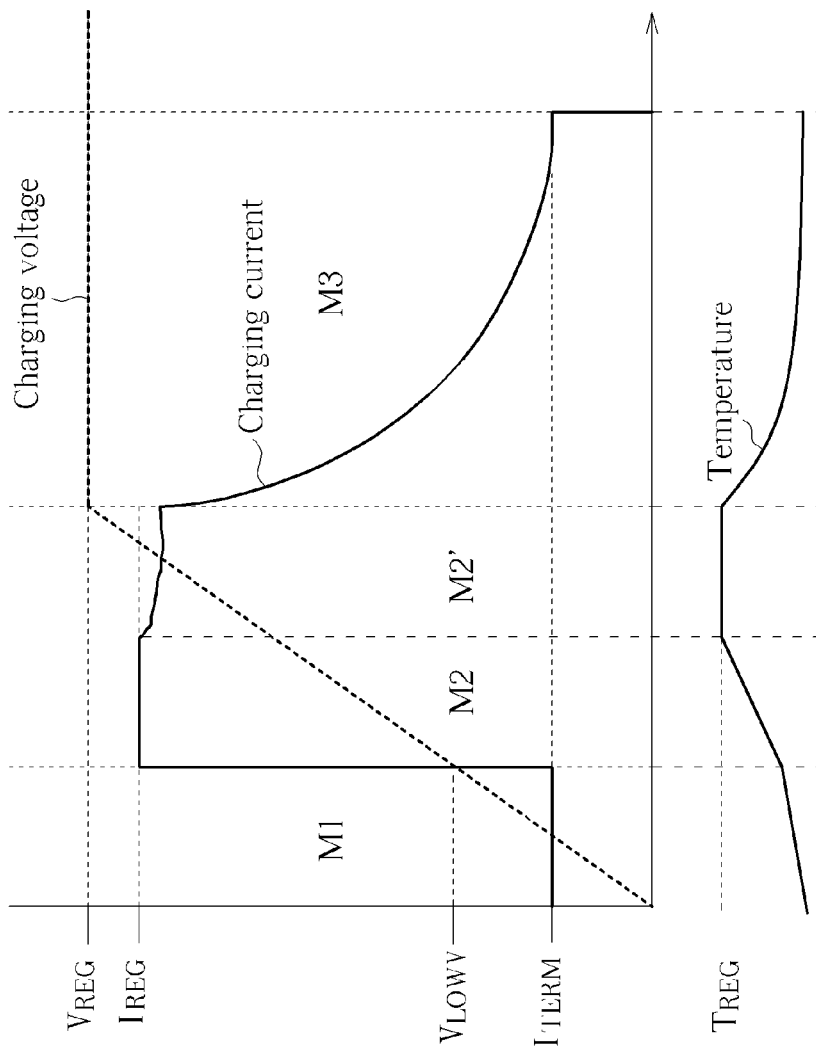
FIG. 3 is a waveform diagram of the charging voltage and current in accordance with the temperature of the rechargeable battery module in the temperature-controlled power supply system according to an embodiment of the present invention.

Please refer to FIG. 3, which is a waveform diagram of the charging voltage and current in accordance with the temperature of the rechargeable battery module 204 in the temperature-controlled power supply system 20 according to an embodiment of the present invention. As shown in FIG. 3, when the power source 202 is turned on and starts to supply power, if the initial voltage of the rechargeable battery module 204 is smaller than a pre-charge threshold voltage $V_{LOWV}$, the charging process falls in the pre-charge mode M1. At this moment, the temperature of the rechargeable battery module 204 may increase a little since the charging current in the pre-charge mode M1 is small. After the voltage of the rechargeable battery is greater than the pre-charge threshold voltage $V_{LOWV}$, the charging process enters the constant current mode M2, i.e. the fast charge mode, and the power source starts to charge the rechargeable battery with a normal current, which is much greater than the charging current in the pre-charge mode M1. At this moment, the temperature of the rechargeable battery module 204 may increase much more. When the temperature of the rechargeable battery module 204 increases to a regulation temperature $T_{REG}$, the charging process enters a constant temperature mode M2', which is different from the conventional charging process. In the constant temperature mode M2', the temperature of the rechargeable battery module 204 maintains at the regulation temperature $T_{REG}$, and the voltage of the rechargeable battery module 204 may still increase. The charging current may fall since if the charging current keeps at the regulation current $I_{REG}$, the temperature of the rechargeable battery module 204 may still increase. Therefore, the charging current should fall in order to maintain the temperature of the rechargeable battery module 204 at the regulation temperature $T_{REG}$. After the voltage of the rechargeable battery increases to the regulation voltage $V_{REG}$, the charging process enters the constant voltage mode M3. The voltage remains at the regulation voltage $V_{REG}$, and the charging current and the temperature of the rechargeable battery module 204 both starts to decrease. After the charging current falls to a termination current $I_{TERM}$, the electricity stored in the rechargeable battery is near full and the charging process terminates.

In the constant temperature mode M2', the temperature of the rechargeable battery module 204 may tend to increase or decrease due to interference from other circuits or ambient environments. If the temperature of the rechargeable battery module 204 tends to increase, the temperature sensing unit 208 receives the increasing temperature and instructs the current control unit 210 to reduce the charging current for the charging unit 206 to charge the rechargeable battery module 204. On the other hand, if the temperature of the rechargeable battery module 204 tends to decrease, the temperature sensing unit 208 receives the decreasing temperature and instructs the current control unit 210 to increase the charging current for the charging unit 206 to charge the rechargeable battery module 204. In some cases, it is difficult to make the temperature of the rechargeable battery module 204 maintain as a constant. However, the charging current can still be controlled by sensing the temperature. One feasible method is to classify the temperature of the rechargeable battery module 204 to several levels and define several charging current values corresponding to those temperature levels. In general, if the temperature falls in a lower level, the current control unit 210 may control the charging current to be a higher current value; if the temperature falls in a high level, the current control unit 210 may control the charging current to be a lower current value. In some cases, the voltage of the rechargeable battery module 204 touches the regulation voltage $V_{REG}$ before the temperature of the rechargeable battery module 204 touches the regulation temperature $T_{REG}$. At this moment, the charging process omits the constant temperature mode M2' and directly proceeds the constant voltage mode M3.

Figure 4:
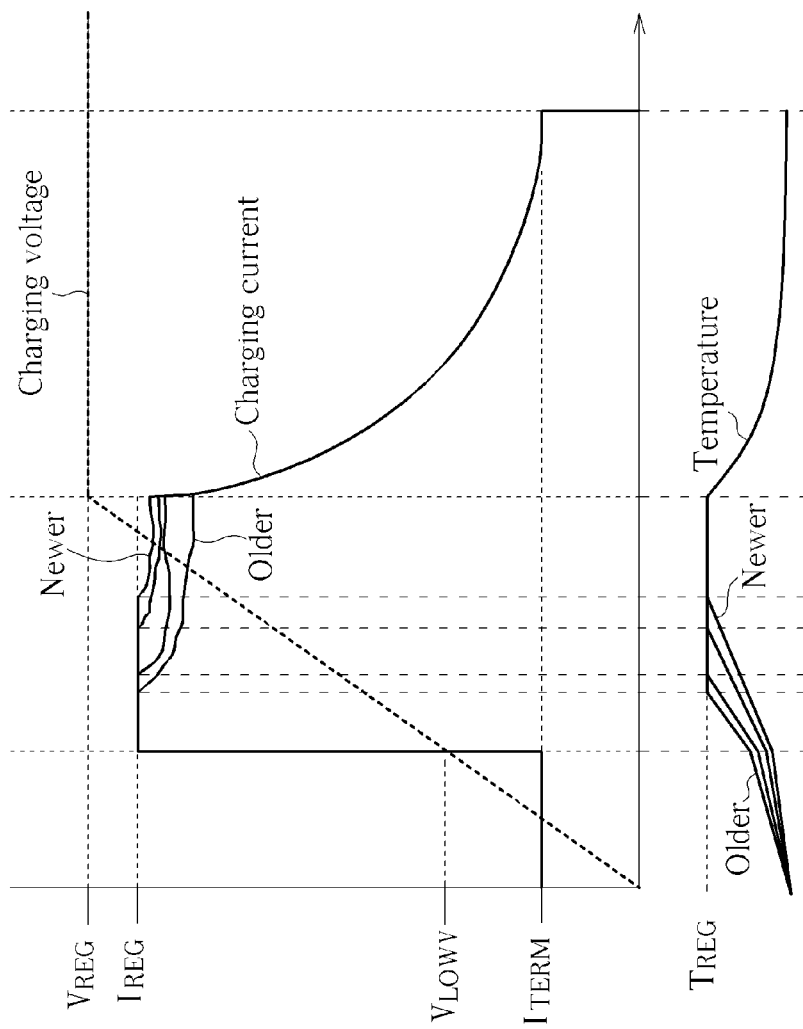
FIG. 4 is a waveform diagram of the charging voltage and current in accordance with the temperature of several rechargeable batteries according to an embodiment of the present invention.

In general, the internal resistance of an older rechargeable battery may be greater than that of a newer rechargeable battery. Power efficiency may be lower in the older rechargeable battery, and more power may be wasted, which may cause the temperature of the older rechargeable battery to increase faster than the newer rechargeable battery. Therefore, the older the rechargeable battery is, the earlier the constant temperature mode M2' occurs. Please refer to FIG. 4, which is a waveform diagram of the charging voltage and current in accordance with the temperature of several rechargeable batteries according to an embodiment of the present invention. As shown in FIG. 4, with the older rechargeable battery, the temperature arrives the regulation temperature $T_{REG}$ faster and the constant temperature mode M2' starts earlier. On the other hand, with the newer rechargeable battery, the temperature arrives the regulation temperature $T_{REG}$ slower and the constant temperature mode M2' starts later. As a result, by properly setting the regulation current $T_{REG}$ and the regulation temperature $T_{REG}$, a temperature-controlled power supply system adaptive for all rechargeable batteries can be achieved.

Please note that, the regulation temperature $T_{REG}$ has to be lower than an over-temperature protection threshold and preferably with a margin. Actually, the regulation temperature $T_{REG}$ is preferably set to be a temperature of the rechargeable battery where power efficiency or life sustainability of the rechargeable battery is optimized.

Figure 5:
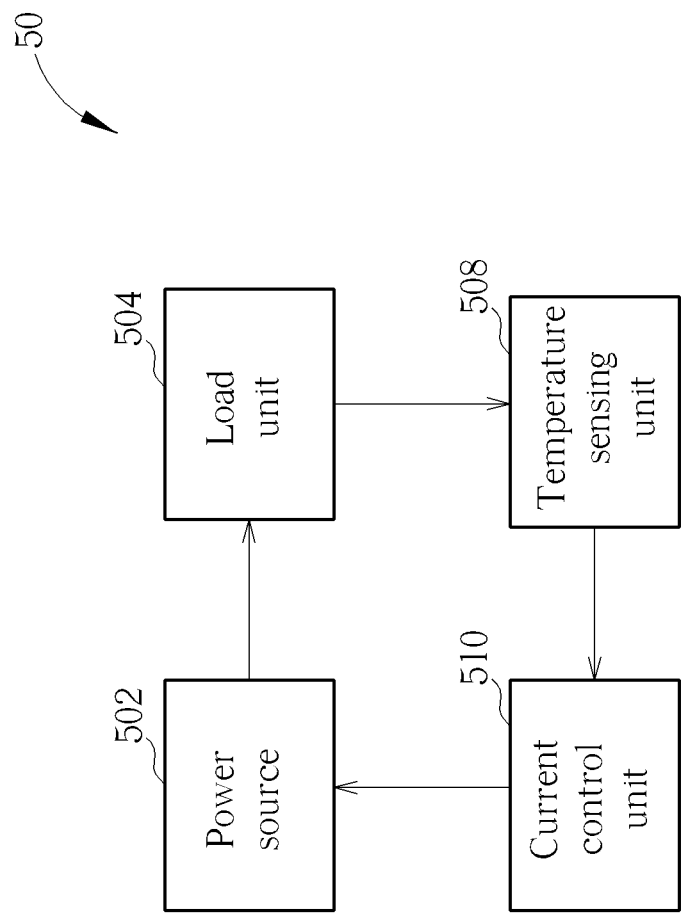
FIG. 5 is a schematic diagram of a general electronic device embodied with a temperature-controlled power supply system according to an embodiment of the present invention.

Noticeably, the spirit of the present invention is to provide a temperature-controlled power supply system. Those skilled in the art can make modifications and alterations accordingly. For example, in addition to a charging system, all kinds of electronic system which needs power supply can be implemented with temperature-control. Please refer to FIG. 5, which illustrates a general electronic device embodied with a temperature-controlled power supply system 50. The temperature-controlled power supply system 50 includes a power source 502, a load unit 504, a temperature sensing unit 508, and a current control unit 510. The power source 502, the temperature sensing unit 508, and the current control unit 510 are similar to the power source 202, the temperature sensing unit 208, and the current control unit 210, respectively. Distinct from the temperature-controlled power supply system 20, the load unit 504 is considered to replace the rechargeable battery module 204, and the charging unit 206 is considered as a current supply unit and implemented in the power source 502. The load unit 504 can be any kinds of loads in an electronic device. The detailed description of the temperature-controlled method can be referred to the above description, and will not be narrated hereinafter.

In the prior art, the conventional charging process charges with a constant current even if the temperature keeps increasing. If the temperature touches an over-temperature protection level, charging may be stopped, and restarted until the temperature falls to another level. As a result, life of the rechargeable battery may be reduced due to high temperature, and frequent stop and restart of charging may reduce the charging efficiency. In comparison, the present invention is capable of maintaining a temperature of a rechargeable battery at a predefined value when the rechargeable battery is under charging, and can prevent the temperature of the rechargeable battery from touching the over-temperature protection level. Therefore, power efficiency and life sustainability of the rechargeable battery can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A temperature-controlled power supply system, comprising:
   a power source, for supplying input power;
   a rechargeable battery module, for receiving the input power for power storage;
   a charging unit, coupled between the power source and the rechargeable battery module, for charging the rechargeable battery module with the input power;
   a temperature sensing unit, coupled to the rechargeable battery module, for sensing a temperature of the rechargeable battery module; and
   a current control unit, coupled to the temperature sensing unit and the charging unit, for controlling a current for charging the rechargeable battery module according to the temperature of the rechargeable battery module;
   wherein the current control unit operates in a constant temperature mode to maintain the temperature of the rechargeable battery module at a predefined value, to control the current for charging the rechargeable battery module.

2. The power supply system of claim 1, wherein the temperature sensing unit comprises a resistor of which a resistance value varies with a variation of ambient temperature.

3. The power supply system of claim 1, wherein when the temperature of the rechargeable battery module tends to increase, the charging unit reduces the current for charging the rechargeable battery module.

4. The power supply system of claim 1, wherein when the temperature of the rechargeable battery module tends to decrease, the charging unit increases the current for charging the rechargeable battery module.

5. A temperature-controlled power supply method, comprising:
   supplying input power;
   charging a rechargeable battery module with the input power;
   sensing a temperature of the rechargeable battery module; and
   controlling a current for charging the rechargeable battery module according to the temperature of the rechargeable battery module;
   wherein controlling the current for charging the rechargeable battery module according to the temperature of the rechargeable battery module comprises operating in a constant temperature mode to maintain the temperature of the rechargeable battery module at a predefined value.

6. The method of claim 5, wherein a resistor of which a resistance value varies with a variation of ambient temperature is utilized for sensing the temperature of the rechargeable battery module.

7. The method of claim 5, wherein when the temperature of the rechargeable battery module tends to increase, the current for charging the rechargeable battery module is reduced.

8. The method of claim 5, wherein when the temperature of the rechargeable battery module tends to decrease, the current for charging the rechargeable battery module is increased.

9. A temperature-controlled power supply system, comprising:
   a power source, for supplying input power;
   a load unit, for receiving the input power;

a temperature sensing unit, coupled to the load unit, for sensing a temperature of the load unit; and a current control unit, coupled to the temperature sensing unit and the power source, for controlling a current for providing the load unit according to the temperature of the load unit;

wherein the current control unit operates in a constant temperature mode to maintain the temperature of the load unit at a predefined value, to control the current for providing the load unit.

10. The power supply system of claim 9, wherein the temperature sensing unit comprises a resistor of which a resistance value varies with a variation of ambient temperature.

11. The power supply system of claim 9, wherein when the temperature of the load unit tends to increase, the power source reduces the current for providing the load unit.

12. The power supply system of claim 9, wherein when the temperature of the load unit tends to decrease, the power source increases the current for providing the load unit.

13. A temperature-controlled power supply method, comprising:

supplying input power to a load unit;
sensing a temperature of the load unit; and
controlling a current for providing the load unit according to the temperature of the load unit;
wherein controlling the current for providing the load unit according to the temperature of the load unit comprises operating in a constant temperature mode to maintain the temperature of the load unit at a predefined value.

14. The method of claim 13, wherein a resistor of which a resistance value varies with a variation of ambient temperature is utilized for sensing the temperature of the load unit.

15. The method of claim 13, wherein when the temperature of the load unit tends to increase, the current for providing the load unit is reduced.

16. The method of claim 13, wherein when the temperature of the load unit tends to decrease, the current for providing the load unit is increased.

* * * * *